(12) United States Patent
Klus

(10) Patent No.: US 6,340,389 B1
(45) Date of Patent: Jan. 22, 2002

(54) FIRE DOOR CORE

(75) Inventor: Donald F. Klus, Tigard, OR (US)

(73) Assignee: G-P Gypsum Corporation, Atlanta, GA (US)

( * ) Notice: Subject to any disclaimer, the term of this patent is extended or adjusted under 35 U.S.C. 154(b) by 0 days.

(21) Appl. No.: 09/738,776

(22) Filed: Dec. 18, 2000

(51) Int. Cl.$^7$ .......................... C04B 14/18; C04B 14/12; C04B 38/08; E04B 5/16

(52) U.S. Cl. .................... 106/675; 106/18.12; 106/602; 106/605; 106/631; 106/772; 106/774; 106/778; 106/DIG. 2; 52/784.11; 264/333

(58) Field of Search ................................ 106/602, 605, 106/631, DIG. 2, 675, 772, 774, 778, 18.12; 52/784.11; 264/333

(56) References Cited

U.S. PATENT DOCUMENTS

| | | |
|---|---|---|
| 3,994,110 A | 11/1976 | Ropella |
| 4,015,386 A | 4/1977 | Cook |
| 4,118,325 A | 10/1978 | Becker et al. |
| 4,159,302 A * | 6/1979 | Greve et al. ................. 264/333 |
| 4,297,311 A | 10/1981 | Sherman et al. |
| 4,343,127 A | 8/1982 | Greve et al. |
| 4,364,987 A | 12/1982 | Goodwin |
| 4,489,121 A | 12/1984 | Luckanuck |
| 4,746,555 A | 5/1988 | Luckanuck |
| 4,748,771 A | 6/1988 | Lehnert et al. |
| 5,256,222 A | 10/1993 | Shepherel et al. |
| 5,522,195 A | 6/1996 | Bargen |
| 5,558,707 A | 9/1996 | Bernt et al. |
| 5,945,208 A | 8/1999 | Richards et al. |

OTHER PUBLICATIONS

New Fire Door Composition Report received from NERAC, Copyright 2001 Nerac, Inc. Mar. 20, 2001 Tech.Spec. Tammy Aston, Citations from CA Search (97–99): CA1 1 through 70.

* cited by examiner

Primary Examiner—Anthony Green
(74) Attorney, Agent, or Firm—Banner & Witcoff, Ltd.

(57) ABSTRACT

The present invention describes improved fire door cores and improved methods of making these fire door cores. The fire door core of the present invention comprises expanded perlite, a fireproof binder, fire clay or vermiculite, and optionally one or more viscosity-enhancing components, fiberglass, or both. The method of making this improved fire door core is a semi-continuous batch press method wherein the expanded perlite, an fireproof binder, fire clay or vermiculite are mixed; the mixture compressed in a mold, and the compressed mixture dried.

20 Claims, No Drawings

FIRE DOOR CORE

TECHNICAL FIELD

This invention is in the field of building materials, especially fire-resistant building materials. Specifically, this invention relates to an improved core construction for fire doors and methods of manufacturing the improved fire door core.

BACKGROUND OF THE INVENTION

Fire doors are generally made for the purpose of stopping or delaying the transfer of thermal energy (i.e., heat), from one side of the door to the other side. Current fire-resistant doors generally contain a fire-resistant core usually encased in a door-shaped shell, wherein the shell is made from various materials generally known to those of ordinary skill in the art. The core is customarily bonded or glued to both inside surfaces of the shell.

Fire doors, as used in residential, commercial, and industrial applications, typically are employed in conjunction with fire walls to provide fire protection between different zones of a structure, and particularly to isolate high fire risk areas of a building from the remainder of the structure, such as the garage of a dwelling from its living quarters. Fire doors usually are not capable of indefinitely withstanding the high temperature conditions of a fire but, rather, are designed to maintain the integrity of the fire wall for a limited time to permit the occupants of a building to escape and to delay the spread of fire until fire control equipment can be brought to the scene.

Various tests have been designed for fire doors and are based on factors, such as the time that a given door would withstand a certain temperature while maintaining its integrity, and hose stream tests which involve the door's ability to withstand the forces of a high pressure water stream. The American Society for Testing Materials (ASTM) has devised tests to establish fire door standards and these standards are incorporated into building codes and architectural specifications. One such standard, ASTM Method E 152, requires a door to maintain its integrity for period ranging up to 1.5 hours while withstanding progressively higher temperatures and erosive effects of a high pressure fire hose at the conclusion of the fire exposure.

Considerations in fire door design, in addition to retarding the advance of fire, include the cost of raw materials and the cost of fabrication. Furthermore, the weight of the door is important, both from the standpoint of ease of handling and cost of transportation. The strength of the door is also a significant factor, since fire doors must pass the above-described water stream tests as well as have the requisite strength to withstand normal use and abuse.

Fire-resistant doors have been made in a variety of constructions utilizing a number of different materials, including wood, metal, and mineral materials. Early forms of fire doors simply comprised wooden cores faced with metal sheeting. Although wood of ample thickness is an effective fire and heat retardant, doors of such construction tend to be heavy and are expensive to fabricate and transport.

Mineral fibers have also been employed in the manufacture of fire doors. The core of a commercial metal fire door principally comprises a composition including mineral fibers and a binder. Such doors suffer, however, from a lack of strength, and handling the friable cores results in the production of irritating dust particles during the manufacturing process.

Current fire-resistant cores are generally constructed using such materials as perlite (which functions as an inorganic filler), gypsum (which functions as the fire resistant material), cement (which functions as a further fire resistant material and counteracts shrinkage of the core), a solution of polyvinyl alcohol and water (which also acts as a binder and increases the viscosity of the mixture of ingredients while also hydrating the gypsum) and fiberglass (which functions as a reinforcing material).

It has also been proposed to make fire doors wherein the core comprises particles of expanded perlite which are bound together by the use of various hydraulic binders including gypsum, cement, and inorganic adhesive material. In order to provide sufficient strength, particularly to withstand handling of the core during manufacture, the core typically is compressed to compact the mixture to a relatively high density, resulting in a heavy door.

Other fire doors have included conventional gypsum wallboard panels as a core material. However, in order to produce sufficient fire resistance, the thickness required of the wallboard is such as to result in an excessively heavy door. Furthermore, internal structural members such as rails or mullions have been found necessary to support and strengthen wallboard panels. The need for such reinforcing elements increases the cost of materials and assembly of such doors. In addition to the above-mentioned considerations, fire doors must, in order to be commercially acceptable, also have other properties that are related to the manufacture, installation and service of the fire door.

Fire door cores that contain a significant proportion of gypsum may lose their fire resistant capabilities in the course of a fire. As is well known, gypsum calcines when contacted with sustained heat. During a fire, calcination of the gypsum in a door core may cause the core to lose strength and integrity, especially when exposed to water, such as a stream of water from a hose. Thus, the fire resistance and structural integrity of such a door core is degraded. Furthermore, current fire-resistant door cores containing gypsum exhibit high water absorption rates thereby increasing both their size and density. Additionally, current fire-resistant door cores have a density significantly greater than the density of the door core of the present invention thereby increasing the cost of manufacturing and transportation. Still furthermore, current fire-resistant door cores exhibit manufacturing difficulties, such as poor cutting qualities, and inability to be sanded after drying to varying thickness that the door cores of the present invention are able to avoid.

Thus, there exists a commercial need for a door core that not only is fire-resistant, but also closer to being fire-proof. In order to meet this commercial need, the door core must maintain its strength and integrity after being exposed to heat. Furthermore, in order to meet the commercial requirements for fire door cores, a door core should be lighter than present fire door cores. Additionally, in order to be commercially viable the new door core must be easily manufactured using techniques well-known in the art, and have improved hose stream resistance. The present invention fulfills all these commercial needs by eliminating gypsum as a major structural component and using an alkali metal silicate as a fireproof binder for a door core having expanded perlite as the major structural component.

SUMMARY OF THE INVENTION

The present invention is directed to a door core that not only is fire-resistant, but also is closer to being fire-proof. The fire door core of the present invention meets or exceeds the fire-resistant capabilities of current fire door cores. The fire door core of the present invention doesn't contain gypsum in a proportion sufficient to degrade performance of the fire door core when exposed to an extended period of heat, as in a fire. Without gypsum, the fire door core of the present invention does not calcine, thereby losing strength and integrity, when subject to sustained periods of heat, such as from a fire. The fire door core of the present invention also uses a fireproof binder that substantially eliminates shrinkage of the door core when the door core is subjected to heat. The fire door core of the present invention also contains fire clay or vermiculite to reduce shrinkage of the door core exposed to sustained periods of intense heat. The fire door core of the present invention can contain additional components that increase the viscosity of the door core in production steps prior to drying. Additionally, the fire door core of the present invention can contain fiberglass.

DETAILED DESCRIPTION OF THE INVENTION

The fire door core of the present invention comprises a mixture of expanded perlite, a fireproof binder and fire clay or vermiculite. Optionally, the fire door core of the present invention can also contain additional components and be reinforced with fibrous material, such as fiberglass. The fire door core of the present invention provides several advantages over current fire-resistant door cores, including but not limited to, increased production capabilities using methods known to those of ordinary skill, decreased raw material consumption, stronger adhesion to door shells, increased tensile and flexural strength, superior hose stream resistance, decreased weight, and better shaping and handling characteristics.

The fire door core of the present invention does not use gypsum as a main structural component and thereby avoids problems associated with current door cores. Current door cores that contain gypsum can not be considered fire-proof; at best, they can only be considered fire-resistant. Fire door cores that contain gypsum have the problem that, when subjected to extended heating, the gypsum calcines and the door core loses its strength and integrity. Thus, when the door core then is contacted by water, typically in the form of a stream of water from a hose, the integrity of the door is compromised because the calcined gypsum is washed away. The fire door core of the present invention meets or exceeds the capabilities of current fire-resistant cores made with set gypsum in standard tests for residential and non-residential use. The fire door core of the present invention also exceeds the capabilities of fire-resistant door cores containing set gypsum in maintaining strength and integrity following prolonged heat, even when exposed to water.

The fire door core of the present invention is made from expanded perlite, fire clay or vermiculite, a fireproof binder, and optionally fibrous material and one or more additional components to make processing easier. The fire door core of the present invention is manufactured by combining wet and dry components to form a wet door core mixture. The wet door core mixture then is molded and pressed to form a wet door core. The wet door core then is dried to form the fire door core of the invention.

The fire door core of the present invention does not have a significant amount of gypsum. A significant amount of gypsum is that quantity of gypsum that would decrease the strength and integrity of the fire door core after the fire door core is exposed to prolonged heat. Typically, the proportion of gypsum in a wet door core of the present invention does not exceed about 10% of the weight of the wet door core, i.e., after the fire door core is pressed but before it is dried. Thus, the proportion of gypsum in a fire door core of the present invention therefore is less than about 8 wt %, based on the weight of the fire door core. Preferably, the amount of gypsum in the wet door core is less than about 3% of the weight of the wet door core (2% of the fire door core); more preferably, the amount of gypsum is less than about 1% of the weight of the wet door core (0.8% of the fire door core); even more preferably, the amount of gypsum is less than about 0.1% of the weight of the wet door core (0.08% of the fire door core); and most preferably, the wet door core and the fire door core are devoid of gypsum.

The fireproof binder in the fire door core of the present invention functions to bond together the other components of the door core. The fireproof binder is alkali metal silicate. Preferably, the alkali metal silicate is sodium silicate or potassium silicate, more preferably sodium silicate. Sodium silicate used in the fire door core of the invention typically has a molar ratio of silica to sodium oxide from about 2.5:1 to about 4:1. Preferably, a ratio of silica to sodium oxide is about 3.22:1.

To serve as a fireproof binder for the expanded perlite and fire clay or vermiculite, the sodium silicate is provided to the mixture generally as an aqueous solution. The solids concentrations in this aqueous solution must yield a wet door core that is easy to handle, both during molding operations and after the wet door core is removed from the mold, and is economically dried. Solutions having lower or higher solids concentrations can be used. However, lower solids concentrations yield a wet door core mixture that is difficult to handle because it is relatively dilute. Lower solids concentrations also yield a wet door core mixture that lacks dimensional stability (i.e., does not retain its shape after molding) and requires additional heat input during drying operations. Similarly, higher solids concentrations make it more difficult to achieve thorough mixing of components in the wet door core mixture and yield a wet door core that is difficult to handle because it has a high solids content. Typically, the solids content of sodium silicate solution used in this invention is between about 30 and about 50 weight percent, preferably between about 34 and 44 weight percent, more preferably about 37 weight percent. A commercial example of the most preferred form of the solution of sodium silicate and water is 'N' grade sodium silicate solution marketed by PQ Corporation of Valley Forge, Pa. This solution has a molar ratio of silica to sodium oxide of 3.22:1 and a solids concentration of 37 weight percent.

The fire door core of the present invention contains sufficient alkali metal silicate to perform the function of binding the components of the fire door core. Typically, the amount of sodium silicate (from a solution of 37 weight percent solids concentration) used is from about 4 to about 19 percent of the weight of the fire door core. Generally, a greater proportion of sodium silicate is required as perlite density increases. Preferably, the amount of such sodium silicate is from about 5 to about 15 percent, more preferably, from about 6 to about 12 percent, and most preferably, from about 7 to about 1I percent of the weight of the fire door core.

The expanded perlite component of the present invention functions as an aggregate filler for the fire door core. Expanded perlite is available in various forms known to those of ordinary skill in the art. Expanded perlite, suitable for use in the present invention, has a density from about 5 to about 11 lbs per cubic foot. Preferably, perlite expanded to a density from about 6 to about 10 lbs per cubic foot is used. Most preferably, perlite expanded to a density from about 7 to about 8 lbs per cubic foot is used.

Generally, expanded perlite will be the major component of the fire door core. The amount of expanded perlite having a density of between about 7 and about 8 pounds per cubic foot used typically is from about 50 to about 80 percent, preferably, from about 55 to about 75 percent, and most preferably, from about 60 to about 73 percent of the weight of the fire door core. While a combination of density and amount of expanded perlite different from the ranges described herein can be used, skilled practitioners recognize that the such a combination has inherent problems. If a more dense perlite is used, manufacturing concerns such as increased production time and cost due to increased water use (the more dense the perlite, the more sodium silicate is required) arise. Use of less dense perlite raises manufacturing concerns, such as undesirable crushing of the expanded perlite, and economical concerns, such as rising per unit cost of manufacture.

The fire clay or vermiculite component of the present invention is well known to skilled practitioners. Any of the various forms of fire clay or vermiculite can be used in the door core.

The amount of fire clay or vermiculite used in the construction of the door core of the present invention is that amount sufficient to prevent shrinkage of the fire-proof door core when it is exposed to intense heat. Skilled practitioners recognize that expanded perlite shrinks, in fact almost fuses, when it is exposed to intense heat (i.e., the heat from prolonged contact with fire), and that the degree of perlite expansion increases the rate of such shrinkage. Therefore, the proportion of fire clay or vermiculite used will vary depending upon both the amount and density of the perlite used in the fire door core. Typically, the amount of fire clay or vermiculite used is from about 2 to about 11 percent, preferably from about 3 to about 8 percent, and most preferably from about 5 to about 7 percent, of the weight of the fire door core when the most preferred form of expanded perlite is used.

Any combination of fire clay and vermiculite can be used as an anti-shrinking agent. Preferably, for a fire door core of the present invention, the anti-shrinking agent is fire clay. While skilled practitioners recognize that greater or lesser amounts of fire clay or vermiculite can be used, they also realize that using too much fire clay or vermiculite increases manufacturing costs and door core densities and that using too little fire clay or vermiculite reduces the strength and integrity of the fire door core.

Optionally, one or more additional viscosity-enhancing components can be used in the fire door core of the present invention. The use of these additional viscosity-enhancing components in the present invention increases the viscosity of both the wet door core mixture and the wet door core. The more viscous wet door core mixture or wet door core achieved with these additional viscosity-enhancing components substantially eliminates handling and transport problems that can arise in wet door core mixtures and wet door cores not using these additional viscosity-enhancing components. Exemplary of some of these additional viscosity-enhancing components are: acetic acid, poly vinyl alcohol, citric acid, polyglycol, propylene glycol, ethylene glycol, sulfuric acid, hydrochloric acid, aluminum sulfate, potassium sulfate, calcium chloride, potassium chloride, lime, magnesium sulfate, sodium citrate, carbon dioxide gas, ammonium sulfate and mixtures thereof. Acetic acid and polyvinyl alcohol are preferred viscosity-enhancing components.

Generally, the amount of the additional viscosity-enhancing components used is sufficient to increase the viscosity of the mixture of the wet door core mixture and the wet door core. Skilled practitioners recognize that many of the components of the fire door core of the present invention, such as the alkali metal silicate and many of the additional viscosity-enhancing components, are available as solids as well as aqueous solutions of varying concentrations. As described herein, the wet door core mixture and wet door core preferably have a solids concentration, and resultant viscosity, that provides ease of handling, i.e., the solids concentration is not so high as to be difficult to mix or transfer from mixer to mold, and not so low as to yield a wet door core that lacks dimensional stability. Therefore, the forms, i.e., whether solid or aqueous solution, of components used typically are selected so that the solids concentration of the wet door core mixture and wet door core need not be adjusted. However, water may be added to obtain a wet door core mixture and wet door core having a desired viscosity, if necessary.

The amount of acetic acid solids used is in this embodiment is generally from about 0.01 to about 2 percent, preferably, from about 0.1 to about 1.8 percent, even more preferably, from about 0.3 to about 1.5 percent, and most preferably from about 0.5 to about 1.3 percent of the weight of the fire door core. Skilled practioners recognize that acetic acid often is available in aqueous solutions having a concentration of acetic acid of between about 1 and 99 volume percent of the solution. Any concentration of about less than 10% by volume acetic acid is suitably used, so long as the viscosity of the wet door core mixture and wet door core is not adversely affected. Preferably, the concentration of the acetic acid is less than about 5% by volume.

In another embodiment of the invention, the amount of polyvinyl alcohol solids used is generally from 0.01 to about 2 wt. percent, preferably, from about 0.1 to about 1.8 wt. percent, and even more preferably, from about 0.6 to ab out 1.3 wt. percent of the weight of the fire door core. Skilled practitioners recognize that polyvinyl alcohol often is available in aqueous soutions having a concentration of polyvinyl alcohol of between about 6 and 12 volume percent of the solution. Any concentration of polyvinyl is suitably used, so long as the viscosity of the wet door core mixture and wet door core is not adversely affected. Preferably, the concentration of the polyvinyl alcohol solution is ab out 6 volume percent.

While specific concentrations, amounts, and identity of additional viscosity-enhancing components have been used to describe different embodiments of the present invention, it is apparent to skilled practitioners that these parameters will vary depending on external preferences such as price and availability of the additional components and that the d described embodiments do not limit the scope of the claimed invention.

The tire door core of the present invention also can optionally contain fiber reinforcement. Preferably, this fiber reinforcement is fiberglass. Fiber reinforcement functions as a reinforcement for the expanded perlite, fireproof binder, and fire clay or vermiculite mixture and improves the material handling properties of the wet door core mixture and wet door core. The amount of fiber reinforcement that can be used to improve the material handling properties of the wet door core mixture and wet door core will depend, among other factors, the amount and density of the expanded perlite used. The amount of fiber reinforcement used in wet door core mixtures and wet door cores of the present invention generally increases as the amount of expanded perlite increases. Typically, the amount of fiber reinforcement used is less than about 1 percent, preferably, from about 0.5 to about 0.7 percent, of the weight of the fire door core.

The fire door core of the present invention may contain other optional components as long as these other components do not adversely affect the advantageous properties of the fire door core of the present invention. Generally, the amount of these other optional components is less than about 30 weight percent of the fire door core. The amount of these optional components is preferably less than about 20 weight percent, even more preferably the amount is less than about 10 weight percent, and most preferably the amount is less than about 1% of the fire door core.

The fire door core of the present invention has advantages in manufacture as compared to current methods for manufacturing door cores. The composition of the present invention allows manufacture of the door core to be in semi-continuous batch press mold process. Known door cores are generally manufactured using a continuous roll press method.

The continuous roll press method is a known process of making fire door cores. Illustrative of the known roll method is the method described in U.S. Pat. No. 5,256,222. A non-solid mixture of the components of the fire door core is deposited onto a moving web drawn from a supply roll by pull rolls. Then, another moving web drawn from its own supply roll by pull rolls is directed by guide and press roll onto the top of the mixture. The thickness of the sandwich of fire door core mixture and webbing then is reduced to a desired value. The roll molded fire door core then is transported by known industrial methods to a drying area. The drying of the roll molded fire door core can be achieved at ambient temperature or by using drying equipment that operates at a temperature greater than room temperature.

In accordance with the semi-continuous batch press mold method of the present invention, the ingredients of the fire door core are mixed in a mixing device to produce the wet door core mixture. Mixing devices suitably used in this step of the process are well known to skilled practitioners. It is preferred that the fire door core ingredients be mixed in a manner such that the expanded perlite is substantially unbroken. In order to substantially eliminate the breaking of the expanded perlite during mixing, preferably the other components of the fire door core are mixed together first. This allows the expanded perlite to thoroughly blend with the other ingredients with a minimum of mixing. The amount of expanded perlite broken during the mixing process can be determined by comparing the volume of the wet door core mixture before and after mixing.

Wet door core mixture then is transferred to a mold having a shape corresponding to desired dimensions. The transfer step can be accomplished using any of the techniques well known to skilled practitioners. The wet door core mixture then is compression molded to compact the mixture to the desired density and thickness to produce a wet door core.

The press molding of the present invention can use any means of pressure well known to those of skilled practitioners. Typically, the amount and length of pressure applied is sufficient to bind the ingredients together in a door core that has a density from about 24 to about 31 pounds per cubic foot after drying, while at the same time insufficient to break a significant number of the expanded perlite particles. Generally, the pressure is from about 200 to about 350 pounds per square inch (psi) for a time from about 0.1 to about 2 minutes, preferably, the pressure is from about 225 to about 325 psi for a time from about 0.2 to about 1 minute, more preferably the pressure is from about 250 to about 300 psi from about 0.4 to about 0.7 minute. As skilled practitioners will recognize the exact pressure and time required will vary for different embodiments of the present invention. The wet door core then is transferred to a drying area.

The wet door core then is dried to produce the fire door core of the present invention. The wet door core is cured (i.e., dried) at a temperature and for a time sufficient to substantially eliminate water from the wet door core. Although the drying can be accomplished at ambient temperature, drying at elevated temperatures is preferred. More preferably, drying of the wet door core is carried out at a temperature from about 400 to about 700 degrees Fahrenheit for a time from about one to about three hours. Even more preferably, drying is carried out at a temperature from about 400 to about 600 degrees Fahrenheit for a time from about one and one half to about two hours. Most preferably, drying is carried out at a temperature from about 400 to about 500 degrees Fahrenheit for a time of about two hours. Skilled practitioners recognize that specific curing times and temperatures will depend on the exact composition of the wet door core.

The manufacture of fire door cores of the present invention has several distinct advantages over manufacture of current fire door cores using continuous roll press techniques. The press mold process controls distortion of the door core and allows better thickness control than roll mold processes. Furthermore, there is no need for webbing on the top and bottom surfaces of the door core during manufacturing as is required during continuous roll press operations. Elimination of the webbing required in press roll operations allows the door core of the present invention to be sanded to the desired thickness. Door cores produced using continuous roll press methods and thus having fascias cannot be sanded, and the thickness of the door core coming out of the last roll is, essentially, the final thickness of the door core. Additionally, the press mold method also eliminates the need to strictly control the amounts of water and binder used in the manufacture of fire door cores. In continuous roll press operations, the core will not mold correctly if the viscosity is too low. Greater variations in water content can be accommodated in a mold operation performed in a container of fixed dimensions. Furthermore, press molding methods of manufacturing fire door cores of the invention requires less drying, and so is more energy efficient.

The fire door core of the present invention has other desirable characteristics. These desirable characteristics differentiate the fire door core of the present invention from current fire door cores. The fire door core of the present invention is easier to handle than current fire door cores, and can be manufactured closer to the desired thickness at press than current fire door cores, thus reducing wastefill size adjustments. The fireproof binder used in fire door cores of the present invention does not deteriorate during either the drying process or a fire. Therefore, the fire door core of the invention can be dried at higher temperatures, thereby increasing production as compared to current fire door cores. The fire door core of the present invention contains substantially no gypsum, thereby eliminating the dimensional increase of gypsum when exposed to water, calcination in the drying process, hydration time needed before drying, and increasing the flexural strength, textural strength, hardness and hose stream resistance as compared to current fire door cores. The fire door core of the present invention is more easily produced and requires less raw materials than current fire door cores while having a lower density (thereby allowing more fire door cores to be shipped per truck), lower surface dust after sanding, better edges when sawing to size, and stronger adhesion to door skins. Furthermore, future fire door cores of the present invention can be constructed from substantial amounts of dust and waste from other fire door cores of the present invention, where current fire door cores can only be use the dust and waste from other current fire door cores in very minor amounts. The following non-limiting examples further illustrate the invention.

EXAMPLE 1

A door core of the present invention of the following composition was manufactured and found to have superior properties when compared to known fire door cores. The fire door core of the present invention had the following composition based on the weight of the wet door core (i.e., the weight of the door core prior to drying) and based upon the weight of fire door core. A 5% by volume acetic acid solution was used.

| Component | Weight Percent of Wet Door Core | Weight Percent of Fire Door Core |
| --- | --- | --- |
| Perlite | 54.7 | 78.0 |
| Fiberglass | 0.5 | 0.7 |
| Water | 14.2 | ≦0.1 |
| Sodium Silicate N | 24.9 | 13.1 |
| Acetic Acid (Solids) | 0.1 | 1.0 |
| Fire Clay | 5.0 | 7.1 |

The fire door core of the present invention was manufactured in the present example as follows:

(1) The perlite, fi re clay, and fiberglass were dry-mixed together for approximately minute wherein the sodium silicate N and aqueous solution of acetic acid were added and the components were mixed for approximately one minute, thereby forming the wet door core mixture.

(2) The wet door core mixture was transferred to a fixed dimensional mold.

(3) The wet door core mixture in the fixed dimensional mold was compressed at a pressure of about 250–300 psi for a time of about 0.5 minutes to form the wet door core.

(4) The wet door core was transferred to a drying area and dried at a temperature of about 500–600 degrees Fahrenheit for a time of about 2 hours, to produce one embodiment of the fire door core of the present invention.

A known fire door core had the following composition based on the weight of the wet door core (i.e., the weight of the door core prior to drying) and based upon the weight of fire door core.

| Component | Weight Percent of Wet Door Core | Weight Percent of Fire Door Core |
| --- | --- | --- |
| Perlite | 49.8 | 65.6 |
| Gypsum | 14.9 | 22.2* |
| Portland Cement | 6.6 | 8.8 |
| Polyvinyl Alcohol (solids) | 1.7 | 2.3 |
| Fiberglass | 0.4 | 0.5 |
| Water | 26.6 | ≦0.1 |

*When gypsum sits it absorbs about 12 weight percent water to hydrate the gypsum. The exact amount of water absorbed by the gypsum is dependent on the gypsum's purity.

Properties of the fire door core of the present invention and the known fire-resistant door core are compared below.

| Test | Standard Fire-Resistant Door Core | Fire Door Core of the Present Invention |
| --- | --- | --- |
| Cure Temperature of Manufacture (° F.) | 335 | 500–600 |
| Cure Time (Hours) | 4.5 | 2 |
| Flame Test (° F.) | 1750 | 1750 |
| Flame Test Duration (Min.) | 90 | 90 |
| Unexposed Temperature (° F.) after 0.5 hours | 198 | 221 |
| Unexposed Temperature (° F.) after 1.5 hours | 486 | 502 |
| Flame Erosion Test (inches) | 0 | 0 |
| Hose Stream Test (inches) | 0.75–1.0 | 0 |
| Density (lbs./cubic foot) | 33–34 | 25–28 |
| Flexural Strength (lbs./square inch) | 80 | 200 |
| Tensile (lbs./2.25 square inches) | 50 | 150+ |
| Screw Holding (lbs./in) | 133 | 200 |

The density measurement in the above comparison is a range of approximately 15 full-size door cores (1.5"×36"×84"). The flame test in the above comparison is the temperature that the door core is subjected to on one side to determine the heat-resistance capabilities of the door core. The unexposed temperature is the temperature of the unexposed side of the fire door core after the duration of the flame test.

In the flame erosion test, a propane flame was positioned at a distance of approximately four (4) inches from the surface of the fire door core and adjusted to produce a temperature of approximately 1700° Fahrenheit. The extent of any degradation in the depth of the fire door core was measured, at the point of flame contact, after approximately ninety (90) minutes of exposure to this temperature.

In the hose stream test, a fire door core from the above-described flame erosion test was placed under a stream of water that flows from a hose at a pressure approximately equal to the pressure at which fire-fighting hoses are operated at for approximately two (2) minutes. The erosion of the fire door core's depth from the water stream was then measured.

The flexural strength test measured a specimen of the fire door core that is 1.5 inches thick, 6 inches inch wide and 16 inches long and placed on bearings at 14 inch centers. The force required to break the specimen was then recorded.

The screw holding capacities of the fire door cores were determined as follows: a 5/32 inch pilot hole was drilled at midwidth of a 1+/−1/32 inch thick, at least 9 inch long, and 1 9/16 inch wide sample of door core that had previously been dried to a constant weight. With the specimen supported on a wooden block or steel plate and the pilot hole centered over a 5/8 inch hole in the support, a No. 12 sheet metal screw was inserted until the full shank thickness penetrated the specimen. Force was then vertically applied at the center of the screw, forcing the screw through the specimen, and the force recorded.

Tensile strength was measured by adhering 2.25 inch square wooden blocks to both sides of a square piece of fire door core of an ordinary depth having both a length and a width of approximately 2.5 inches. Standard hook eye screws then were inserted into the wooden blocks to a depth such that the standard hook eye screws do not penetrate the square fire door core sample, but have a sufficient holding capability to perform the tensile strength test. The hook eye screws are then attached to a hydraulic cylinder by any known method. The hydraulic cylinder then used sufficient force to pull the square wooden blocks from the sample of the fire door core. The force that pulled the square wooden blocks was then recorded at the point at which the sample of the fire door core was broken.

EXAMPLE 2

A door core of the present invention of the following composition was manufactured and found to have superior or equal desirable properties when compared to known fire door cores. The fire door core of the present invention and the known fire door core had the following compositions based on the weight of each respective fire door core. A 6 weight percent polyvinyl alcohol solution was used to provide the polyvinyl alcohol solids.

| Component | Weight Percent of Standard Fire Door Core | Weight Percent of Fire Door Core of the Present Invention |
|---|---|---|
| Perlite | 70.4 | 73.6 |
| Gypsum | 18.7 | 0 |
| Portland Cement | 8.3 | 0 |
| Fiberglass | 0.5 | 0.6 |
| Sodium Silicate N | 0 | 19.6 |
| Polyvinyl Alcohol (Solids) | 2.1 | 1.2 |
| Water | ≦0.1 | ≦0.1 |
| Fire Clay | 0 | 4.9 |

The fire door core of the present invention was constructed in the manner described in Example 1. At typical commercial prices for the various components, the cost of producing the fire door core of the present invention was lower than that of the known fire door core.

What is claimed is:

1. A fire door core consisting essentially of:
    (a) expanded perlite,
    (b) a fireproof binder,
    (c) fire clay or vermiculite
and less than about 8 weight percent gypsum, based on the weight of the fire door core, such that gypsum is not a main structural component of said fire door core.

2. The fire door core of claim 1 wherein the expanded perlite has a density of from about 7 to about 8 pounds per cubic foot.

3. The fire door core of claim 1 wherein said fire door core has a density of from about 26 to about 31 pounds per cubic foot.

4. The fire door core of claim 2 wherein said expanded perlite is from about 50 to about 80 weight percent of the fire door core.

5. The fire door core of claim 1 wherein said fireproof binder is selected from the group consisting of potassium silicate, sodium silicate, and combinations thereof.

6. The fire door core of claim 5 wherein said fireproof binder is from about 4 to about 19 weight percent of the fire door core.

7. The fire door core of claim 6 wherein said fireproof binder is from about 5 to about 15 weight percent of the fire door core.

8. The fire door core of claim 1 wherein said fire clay or vermiculite is from about 2 to about 11 weight percent of the fire door core.

9. The fire door core of claim 8 wherein said fire clay or vermiculite is from about 3 to about 8 weight percent of the fire door core.

10. A fire door core consisting essentially of:
    (a) expanded perlite in an amount from about 50 to about 80 weight percent of said fire door core;
    (b) fireproof binder in an amount from about 5 to about 15 weight percent of said fire door core; and
    (c) fire clay or vermiculite in an amount from about 2 to about 11 weight percent of said fire door core
and less than about 8 weight percent gypsum, based on the weight of the fire door core, such that gypsum is not a main structural component of said fire door core.

11. The fire door core of claim 10 wherein said fireproof binder is selected from the group consisting of potassium silicate, sodium silicate, and combinations thereof.

12. A method of making a fire door core comprising:
    (a) combining fire door core components consisting essentially of expanded perlite, a fireproof binder, and fire clay or vermiculite to form an aqueous wet door core mixture;
    (b) press molding the aqueous wet door core mixture formed in step (a) in a press mold for a time and at a pressure sufficient to bind the materials together into a wet door core; and
    (c) curing the wet door core of step (b) for a time and temperature sufficient to remove substantially all the water from the mixture and to form the fire door core.

13. The method of claim 12 wherein step (b) is performed at a pressure and time so that the density of the fire door core of step (c) is from about 26 to about 31 pounds per square inch.

14. The method of claim 12 wherein step (b) is performed at a pressure from about 250 to about 300 pounds per square inch for a time of from about 0.4 to about 0.5 minutes.

15. The method of claim 12 wherein step (c) is performed at a temperature of from about 500 to about 600 degrees Fahrenheit for a time of about 2.5 hours.

16. A fire door core consisting essentially of:
    (a) expanded perlite,
    (b) a fireproof binder,
    (c) fire clay or vermiculite,
    (d) fiberglass, said fiberglass present in an amount of about 0.6 to about 1.0 weight percent of the fire door core
and less than about 8 weight percent gypsum, based on the weight of the fire door core, such that gypsum is not a main structural component of said fire door core.

17. A method of making a fire door core comprising:
    (a) combining fire door core components consisting essentially of expanded perlite, a fireproof binder, fire clay or vermiculite and at least one viscosity-enhancing component to form an aqueous wet door core mixture, said viscosity-enhancing component provided in an amount sufficient to increase the aqueous wet door core mixture viscosity, said viscosity-enhancing, component selected from the group consisting of polyvinyl alcohol, acetic acid, and mixtures thereof;
    (b) press molding the aqueous wet door core mixture formed in step (a) in a press mold for a time and at a pressure sufficient to bind the materials together into a wet door core; and
    (c) curing the wet door core of step (b) for a time and temperature sufficient to remove substantially all the water from the mixture and to form the fire door core.

18. The method of claim 17 wherein said viscosity-enhancing component is acetic acid.

19. The method of claim 17 wherein said viscosity-enhancing component is polyvinyl alcohol.

20. A method of making a fire door core comprising:
    (a) combining fire door core components consisting essentially of expanded perlite, a fireproof binder, fire clay or vermiculite and at least one viscosity-enhancing component to form an aqueous wet door core mixture, said viscosity-enhancing component provided in an amount from about 0.01 to about 2 percent of the weight of the fire door core;

(b) press molding the aqueous wet door core mixture formed in step (a) in a press mold for a time and at a pressure sufficient to bind the materials together into a wet door core; and (c) curing the wet door core of step (b) for a time and temperature sufficient to remove substantially all the water from the mixture and to form the fire door core.

* * * * *

UNITED STATES PATENT AND TRADEMARK OFFICE
CERTIFICATE OF CORRECTION

PATENT NO.    : 6,340,389 B1
DATED         : January 22, 2002
INVENTOR(S)   : Donald Klus It is certified that error appears in the above-identified patent and that said Letters Patent is hereby corrected as shown below:

Column 4,
Line 46, "Pa" has been replaced with -- PA --;

Column 4,
Line 59, "1I" has been replaced with -- 11 --;

Column 6,
Line 40, "soutions" has been replaced with -- solutions --;

Column 6,
Line 45, " ab out" has been replaced with -- about --;

Column 6,
Line 55, "tire" has been replaced with -- fire --;

Column 8,
Line 48, "wastefill" has been replaced with -- wasteful --.

Signed and Sealed this

Thirty-first Day of December, 2002

JAMES E. ROGAN
*Director of the United States Patent and Trademark Office*